United States Patent [19]
Zomorodi

[11] Patent Number: 5,279,843
[45] Date of Patent: Jan. 18, 1994

[54] METHOD FOR PACKING FRESH VEGETABLES WITH WATER

[75] Inventor: Brian Zomorodi, Glendale, Calif.

[73] Assignee: Ready Pac Produce, Pasadena, Calif.

[21] Appl. No.: 911,909

[22] Filed: Jul. 10, 1992

[51] Int. Cl.⁵ ............................................. A23B 7/14
[52] U.S. Cl. .................................. 426/324; 426/318; 426/402; 426/404; 426/410; 426/415; 426/615
[58] Field of Search .............. 426/392, 394, 397, 402, 426/404, 410, 415, 106, 615, 324, 316, 318, 262

[56] References Cited

U.S. PATENT DOCUMENTS

| | | | |
|---|---|---|---|
| 2,531,463 | 11/1950 | Pryor et al. | 426/318 |
| 3,814,820 | 6/1974 | Busta et al. | 426/262 |
| 4,001,443 | 1/1977 | Dave | 426/106 |
| 4,202,912 | 3/1980 | Kim | 426/615 |
| 4,711,789 | 12/1987 | Orr et al. | 426/415 |
| 4,808,420 | 2/1989 | Splinger et al. | 426/615 |
| 4,855,153 | 8/1989 | Orr et al. | 426/410 |
| 4,943,440 | 7/1990 | Armstrong | 426/106 |
| 5,151,286 | 9/1992 | Adams et al. | 426/615 |

Primary Examiner—Robert A. Dawson
Assistant Examiner—Ana M. Fortuna
Attorney, Agent, or Firm—Limbach & Limbach

[57] ABSTRACT

A process is disclosed for packaging fresh vegetables in water. The process includes washing the vegetables, dipping them in a chlorine bath and placing them in bags. Then, water that has been irradiated by ultraviolet light, to reduce the number of bacteria colonies, is added to the vegetables. The bags are then sealed and stored.

24 Claims, 5 Drawing Sheets

METHOD FOR PACKING FRESH VEGETABLES WITH WATER

TECHNICAL FIELD

The subject invention relates to a method for packaging fresh vegetables

BACKGROUND OF THE INVENTION

In prior art methods, fresh vegetables were typically not packaged in water, because the water promoted bacterial growth. Instead, they were spin-dried and vacuum packed. These prior art methods have some undesirable characteristics. First, vegetables that are dried and vacuum packed in this manner are susceptible to whitening due to dehydration. Also, vegetables such as carrots and celery that are normally crisp tend to feel chewy.

SUMMARY OF THE INVENTION

In order to overcome the problem in the prior art method, a new approach has been developed for packaging fresh vegetables including the steps of cutting and washing the vegetables, dipping the vegetables in a chlorine bath, adding filtered water to the vegetables and then vacuum packing them so that there is no water loss Various sanitizing steps are also included.

DETAILED DESCRIPTION OF THE PREFERRED EMBODIMENT

FIGS. 1-5 illustrate the method of the subject invention. In the preferred embodiment, carrots are used as representative of the fresh vegetables to be packaged.

The raw carrots are initially received and stored at temperatures between 34° and 45° F. Carrots having defects such as cracks and black spots are removed and the rest are stored in a refrigerator at a temperature between 34° and 40° F.

First, the carrots are peeled in a chlorine bath. The chlorine bath preferably has 20 ppm chlorine in water at a temperature between 34° and 48° F. A Van Mark peeler can be used for peeling. (It should be noted that this peeling step is omitted with vegetables such as celery). The carrots are then cut into smaller pieces ($\frac{3}{8}"\times\frac{3}{8}"\times 4"$) by blades that are first cleaned and sanitized.

The carrots are then passed along to a shaker to remove pieces smaller than a predetermined size. The shaker can be a spin-dry barrel that is elevated from the floor.

Figure 1:
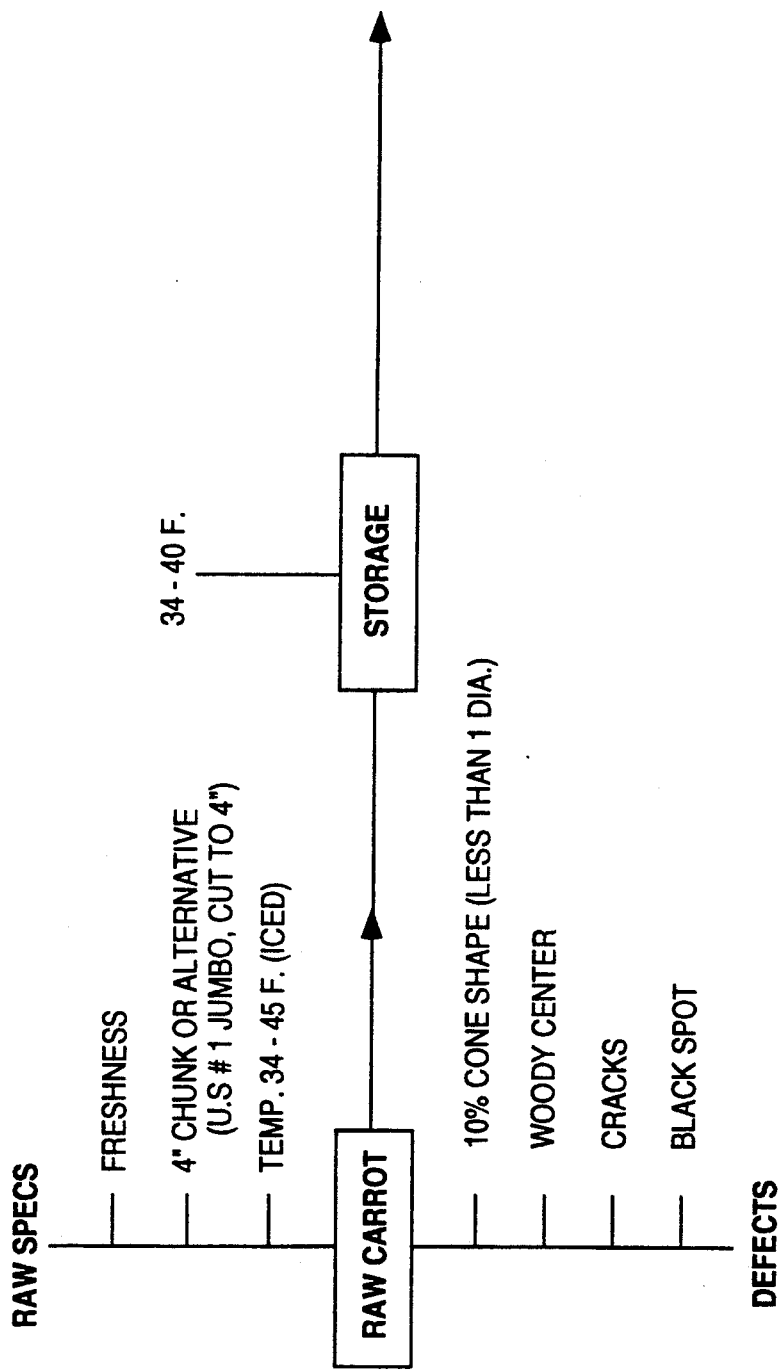
FIGS. 1-5 illustrate a flow chart of the steps performed in the subject invention.
Figure 2:
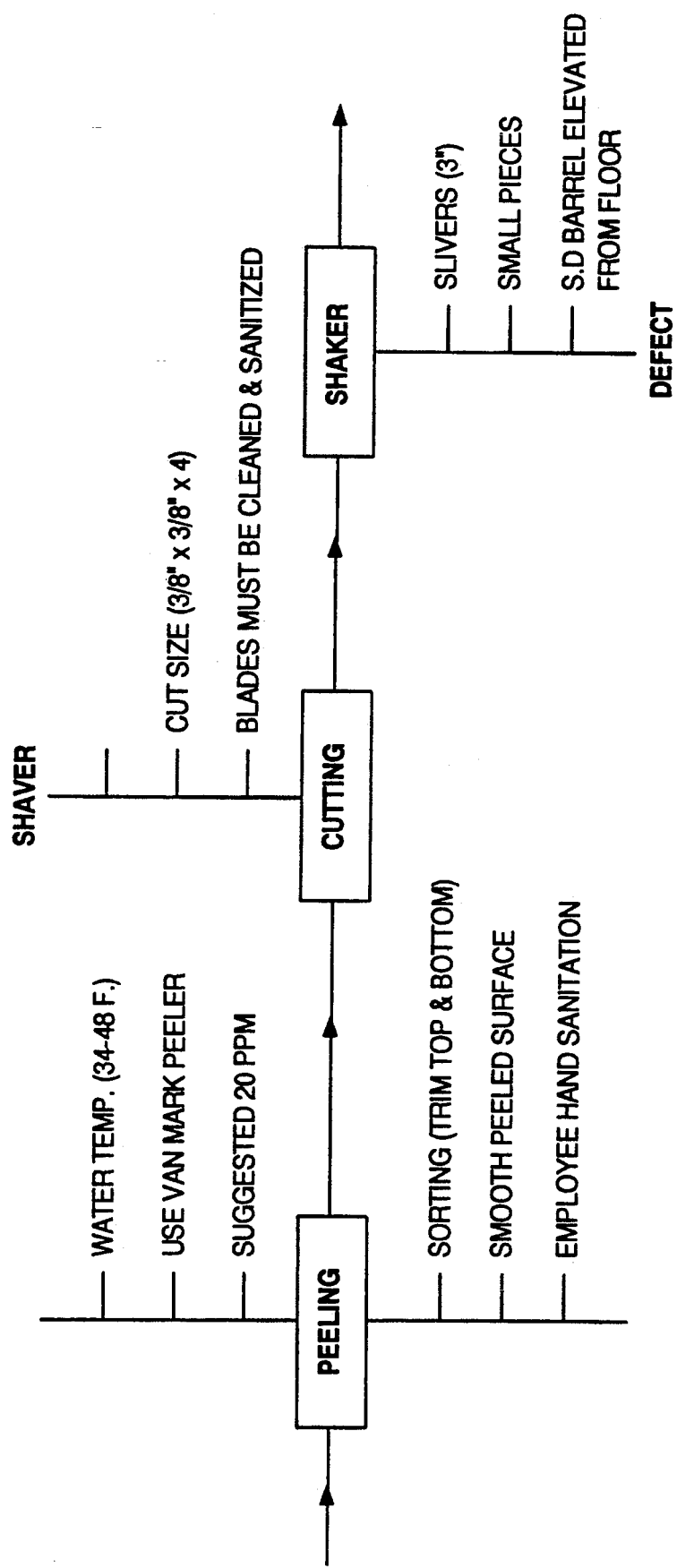
Figure 3:
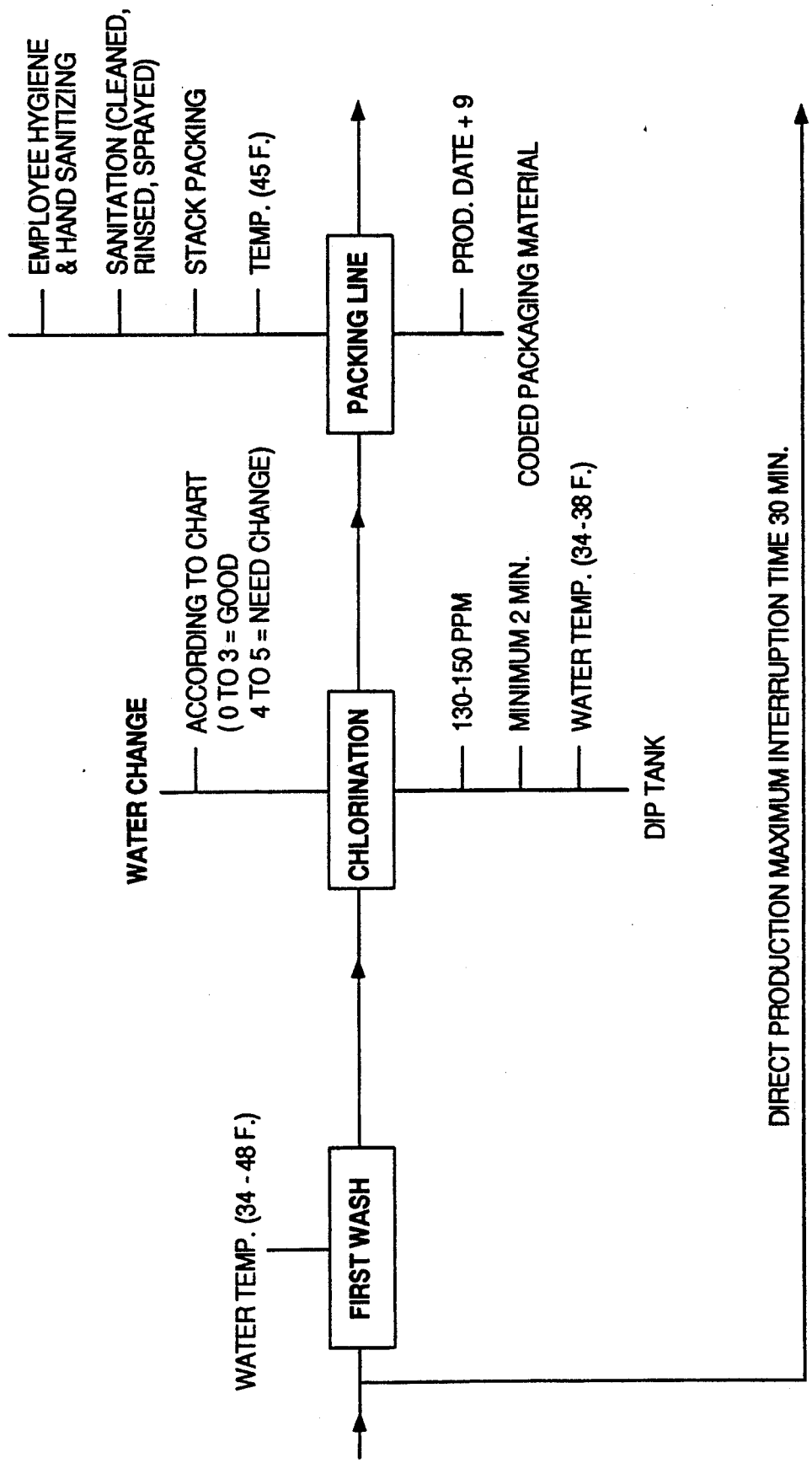

As shown in FIG. 3, the carrots are then washed in water at a temperature between 34° and 48° F. before being dipped into a chlorine bath for at least 2 minutes. The chlorine bath preferably has 130-150 ppm chlorine in water at a temperature between 34° and 38° F.

At this point, the standard plate count of bacteria in the carrots which was less than 100,000 colonies per gram after the peeling step, is less than 10,000 colonies per gram.

The carrots are then passed along to a packaging line where they are placed in coded packaging material bearing information such as production date, etc. Plastic bags with a thickness between 1.5 and 2.5 mil. are used in this step. These bags have a minimum oxygen permeability of 100 cc per 100 square inches.

The maximum interruption time that passes from just before the vegetables are washed until after the vegetables enter the packaging line is preferably 30 minutes.

Figure 4:
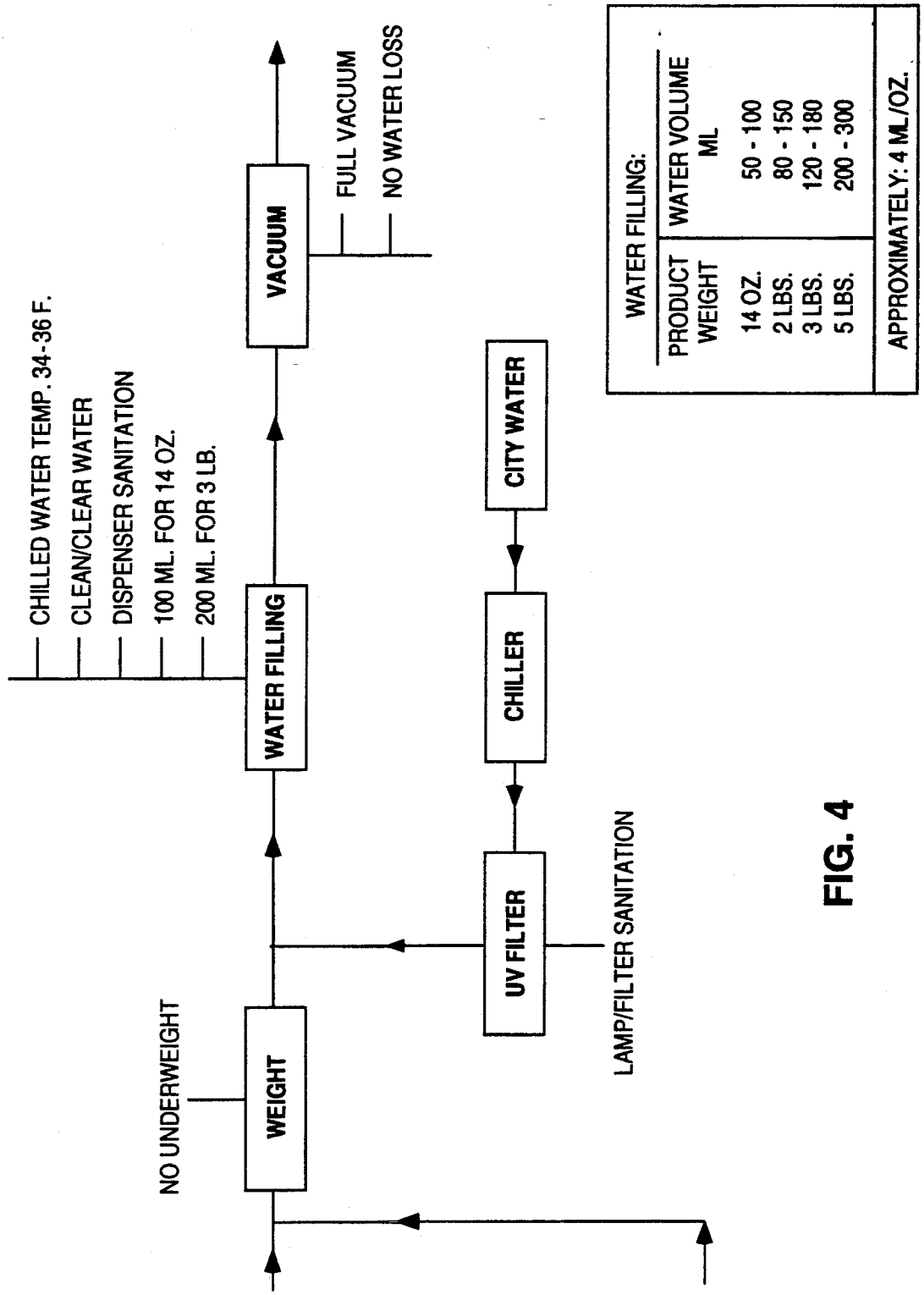

As shown in FIG. 4, the packages are weighed to make sure that none of them are below a predetermined weight before being filled with water.

In the water filling step, the packages containing the carrots are filled with clean, clear, water at a temperature that is preferably between 34°-36° F. The water filling table shown below indicates the preferable range of water volumes to be added to each package depending upon its weight.

TABLE 1

| Weight (oz.) | Water vol. (ml) | ml per ounce |
|---|---|---|
| 14 | 50-100 | 3.57-7.14 |
| 32 | 80-150 | 2.50-4.69 |
| 48 | 120-180 | 2.50-3.75 |
| 80 | 200-300 | 2.50-3.75 |

As shown in TABLE 1, the range varies somewhere between 2-8 ml/ounce For weights of 32, 48 and 80 ounces, the range varies between 2.5-5 ml/oz.

The water that is used for filling the packages is filtered city water. The city water, having a standard plate count of bacteria less than 1,000 colonies per gram, is chilled and then irradiated by an ultraviolet (UV) filter. This filtering reduces the standard plate count to less than 10 colonies per gram. The UV filter sold by Aquianics (model no. FF1-42-V1) is suitable for this purpose. After the water filling step, the package is vacuum packed such that water loss is avoided as best as possible At this point, the standard plate count of the carrots is less than 10,000 colonies per gram.

Figure 5:
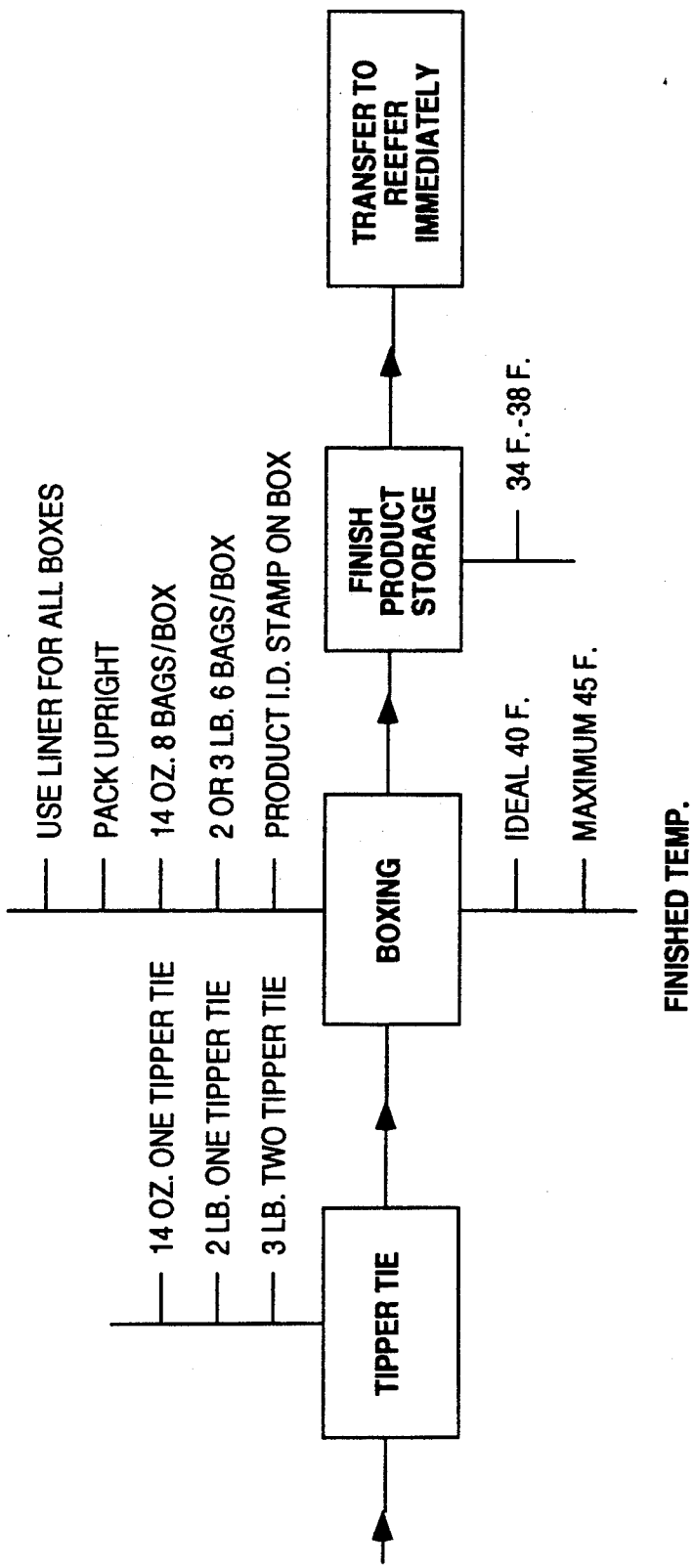

As shown in FIG. 5, the package is tied with a metal clip. The clip is crimped to produce a micro-vent to allow some oxygen exchange The packages are then placed in a plastic liner and boxed in boxes bearing a ID stamp. The boxing of the products should preferably occur at a temperature of 40° F., but in any case at a temperature not to exceed 45° F. Finally, the product is stored at a temperature between 34° and 38° F.

It is noted that employee hand sanitation is needed during the peeling and packaging steps. Also, the dispenser used in the water filling step should be sanitized.

While the subject invention has been described with reference to a preferred embodiment, various other modifications could be made therein with out varying from the scope and spirit of the subject invention as defined by the appended claims.

I claim:

1. A method of packaging fresh vegetables comprising the steps of:
   washing the vegetables;
   placing the vegetables in a bag;
   adding an amount of water to said bag in a range of 2 to 8 millimeters per ounce of vegetables, with said water having been filtered with UV radiation to reduce the bacteria colonies; and
   sealing said bag in a manner to minimize water loss.

2. A method as recited in claim 1 wherein said amount of water is in a range of 2.5 to 5 milliliters per ounce of vegetables.

3. A method as recited in claim 1 wherein said water has a standard plate count of less than 10 colonies of bacteria per gram, after being filtered, and is at a temperature between 34°–36° F.

4. A method as recited in claim 1 wherein said step of washing includes a step of dipping the vegetables in a chlorine bath for at least 2 minutes.

5. A method as recited in claim 4 wherein said chlorine bath has 130–150 ppm of chlorine in water at temperature between 34°–38° F.

6. A method as recited in claim 5 wherein carrots are used as the vegetables.

7. A method as recited in claim 5 wherein celery is used as the vegetables.

8. A method as recited in claim 1 wherein said step of sealing includes a step of vacuum-packing.

9. A method as recited in claim 8 further comprising the following step after said step of vacuum-packing:
tying said bag with a metal clip so as to form a micro-vent that permits oxygen exchange.

10. A method as recited in claim 1 wherein said bag is made of plastic and has a thickness between 1.5 and 2.5 mil.

11. A method as recited in claim 10 wherein said bag has a minimum oxygen permeability of 150 cc. per 100 square inches.

12. A method of packaging carrots comprising the steps of:
peeling the carrots in chlorinated water;
washing the carrots;
dipping the carrots in a chlorine bath;
placing the carrots in a bag;
adding an amount of water to the bag containing the carrots in the range of 2 to 8 milliliters per ounce of carrots, with said water having been filtered with ultraviolet radiation; and
vacuum-packing the bag.

13. A method as recited in claim 12 wherein said amount of water is in a range of 2.5 to 5 milliliters per ounce of carrot.

14. A method as recited in claim 12 wherein said step of peeling the carrots uses chlorinated water having 20 ppm chlorine.

15. A method as recited in claim 14 wherein said chlorinated water is at a temperature between 34°–48° F.

16. A method as recited in claim 12 further comprising the following steps to be performed after said step of vacuum-packing the bag:
tying the bag with a metal clip;
placing the bag in a box; and
storing the box at a temperature between 34°–38° F.

17. A method as recited in claim 16 wherein said metal clip is crimped to form a micro-vent that permits oxygen exchange; and
wherein said step of placing the bag in a box conducted at a temperature not to exceed 45° F.

18. A method as recited in claim 12 wherein said step of vacuum-packing the bag is accomplished without any water loss.

19. A method as recited in claim 12 wherein a maximum interruption time of 30 minutes is set for the steps of washing the carrots, dipping the carrots in a chlorine bath and placing the carrots in bags.

20. A method as recited in claim 12 wherein said water has a standard plate count of less than 10 colonies of bacteria per gram, after being filtered, and is at a temperature between 34°–36° F.

21. A method as recited in claim 12 wherein said step of washing includes a step of dipping the carrots in a chlorine bath for at least 2 minutes.

22. A method as recited in claim 21 wherein said chlorine bath has 130–150 ppm of chlorine in water at a temperature between 34°–38° F.

23. A method as recited in claim 12 wherein said bag is made of plastic and has a thickness between 1.5 and 2.5 mil.

24. A method as recited in claim 23 wherein said bag has a minimum oxygen permeability of 150 cc. per 100 square inches.

* * * * *